(12) United States Patent
Simon

(10) Patent No.: US 7,616,849 B1
(45) Date of Patent: Nov. 10, 2009

(54) ILLUMINATING DEVICES INCLUDING UNIFORM LIGHT DISTRIBUTION, MULTIPLE LIGHT SOURCES, AND MULTIPLE TYPES OF LIGHT SOURCES

(76) Inventor: Jerome H. Simon, 70 Sumner St., Newton Centre, MA (US) 02459

( * ) Notice: Subject to any disclaimer, the term of this patent is extended or adjusted under 35 U.S.C. 154(b) by 354 days.

(21) Appl. No.: 11/387,327

(22) Filed: Mar. 23, 2006

Related U.S. Application Data

(60) Provisional application No. 60/664,412, filed on Mar. 23, 2005.

(51) Int. Cl.
| | |
|---|---|
| G02B 6/26 | (2006.01) |
| G02B 6/36 | (2006.01) |
| G02B 6/00 | (2006.01) |
| G02B 6/10 | (2006.01) |
| G01D 11/28 | (2006.01) |
| E05B 17/10 | (2006.01) |
| F21V 9/16 | (2006.01) |
| F21V 33/00 | (2006.01) |
| F21V 7/00 | (2006.01) |
| F21V 5/00 | (2006.01) |
| F21V 7/04 | (2006.01) |

(52) U.S. Cl. .............. 385/31; 385/32; 385/33; 385/34; 385/88; 385/92; 385/122; 385/129; 385/130; 385/131; 385/132; 362/23; 362/26; 362/28; 362/31; 362/84; 362/100; 362/101; 362/297; 362/298; 362/299; 362/300; 362/327; 362/328; 362/329; 362/330; 362/335; 362/337; 362/520; 362/602; 362/604; 362/608; 362/609; 362/610; 362/612; 362/613; 362/614; 362/615; 362/625; 362/626; 362/800

(58) Field of Classification Search ............. 385/31–34, 385/88, 92, 122, 129–132; 362/23, 26, 28, 362/31, 100, 297–300, 327–330, 335, 337, 362/520, 602, 604, 608–610, 612–615, 625, 362/626, 800; 257/81, 82, 99, E31.108, E31.117, 257/E31.127

See application file for complete search history.

(56) References Cited

U.S. PATENT DOCUMENTS

| | | | | |
|---|---|---|---|---|
| 5,032,960 | A * | 7/1991 | Katoh | 362/240 |
| 6,097,549 | A * | 8/2000 | Jenkins et al. | 359/726 |
| 6,193,383 | B1 * | 2/2001 | Onikiri et al. | 362/26 |
| 6,598,998 | B2 * | 7/2003 | West et al. | 362/307 |
| 7,218,830 | B2 * | 5/2007 | Iimura | 385/146 |
| 2004/0042194 | A1 * | 3/2004 | Hsieh | 362/31 |
| 2005/0237747 | A1 * | 10/2005 | Shimizu et al. | 362/294 |

\* cited by examiner

*Primary Examiner*—Charlie Peng
*Assistant Examiner*—Hung Lam
(74) *Attorney, Agent, or Firm*—Burns & Levinson LLP; Harvey Kaye; David W. Gomes

(57) ABSTRACT

An optical device for collecting and distributing light from a quasi point light source which includes a planar light guide having surfaces through which optical axes are periodically spaced. There is at least one quasi point light source, the optical axis of each being coincident with the optical axes of the surfaces. There is also at least one optical element depressed within the edges or adjacent surfaces of the light guide at least partially rotated about the optical axis, and having a focal point at the quasi point light source.

10 Claims, 7 Drawing Sheets

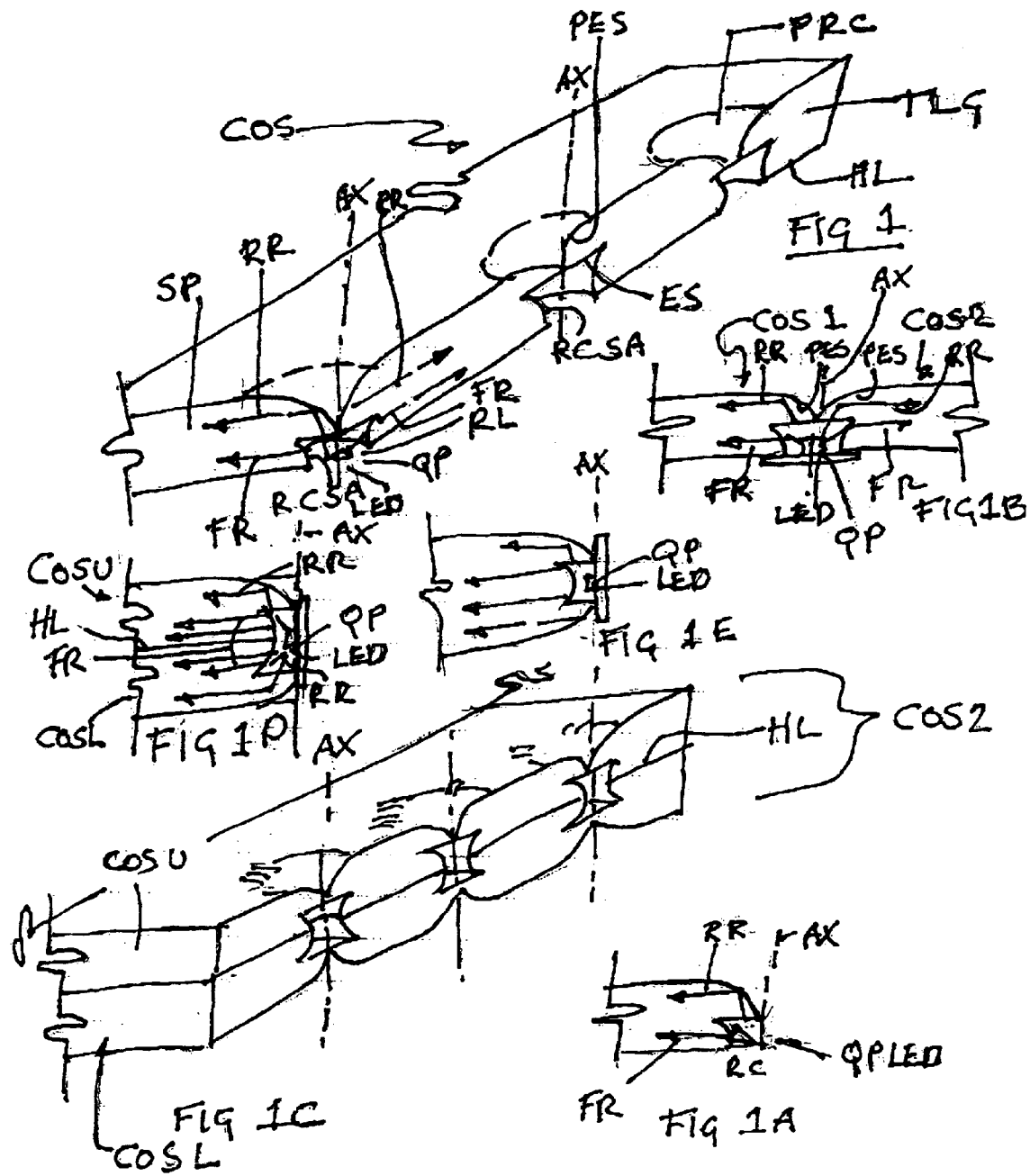

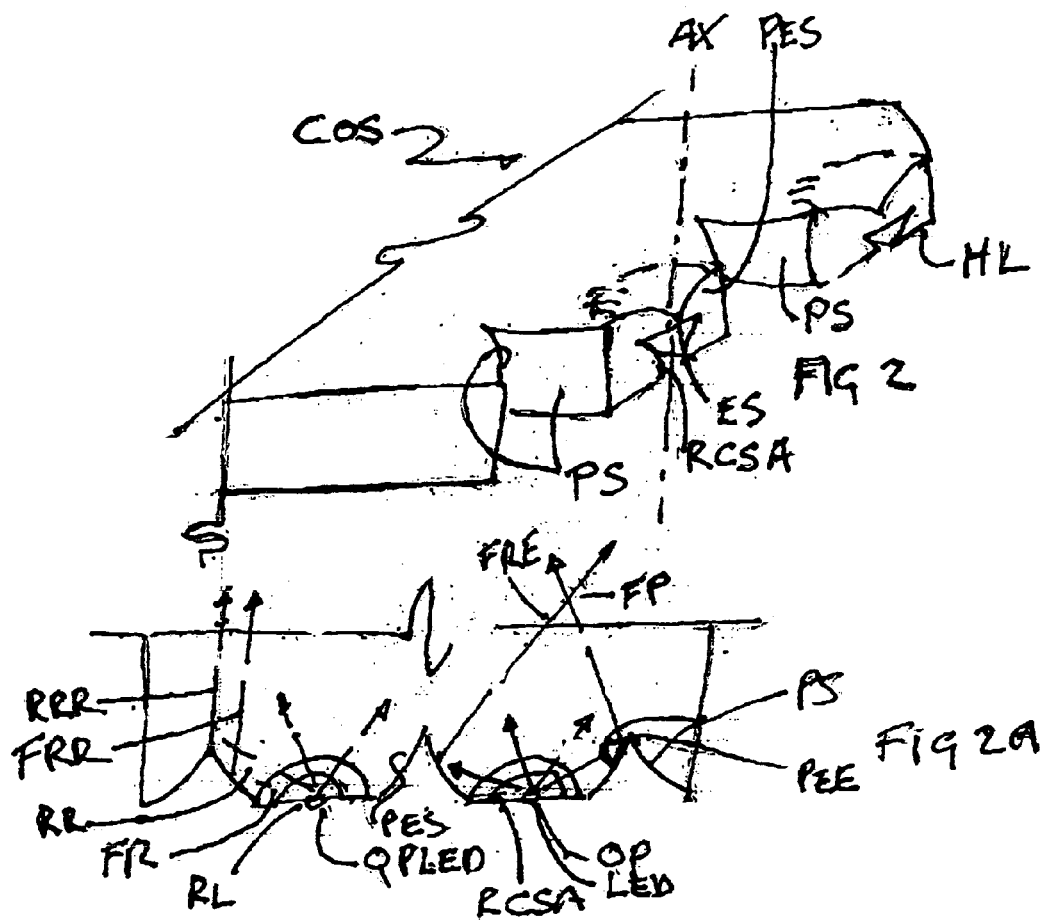

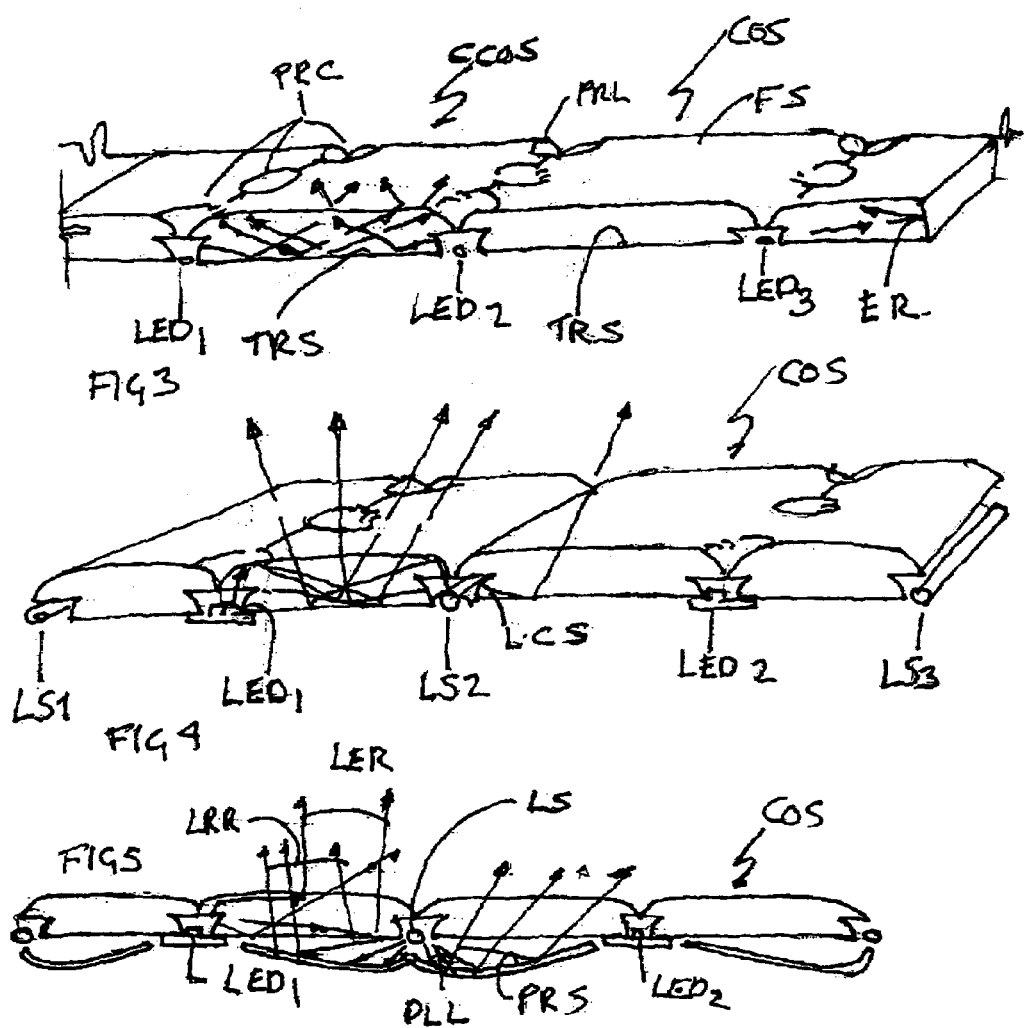

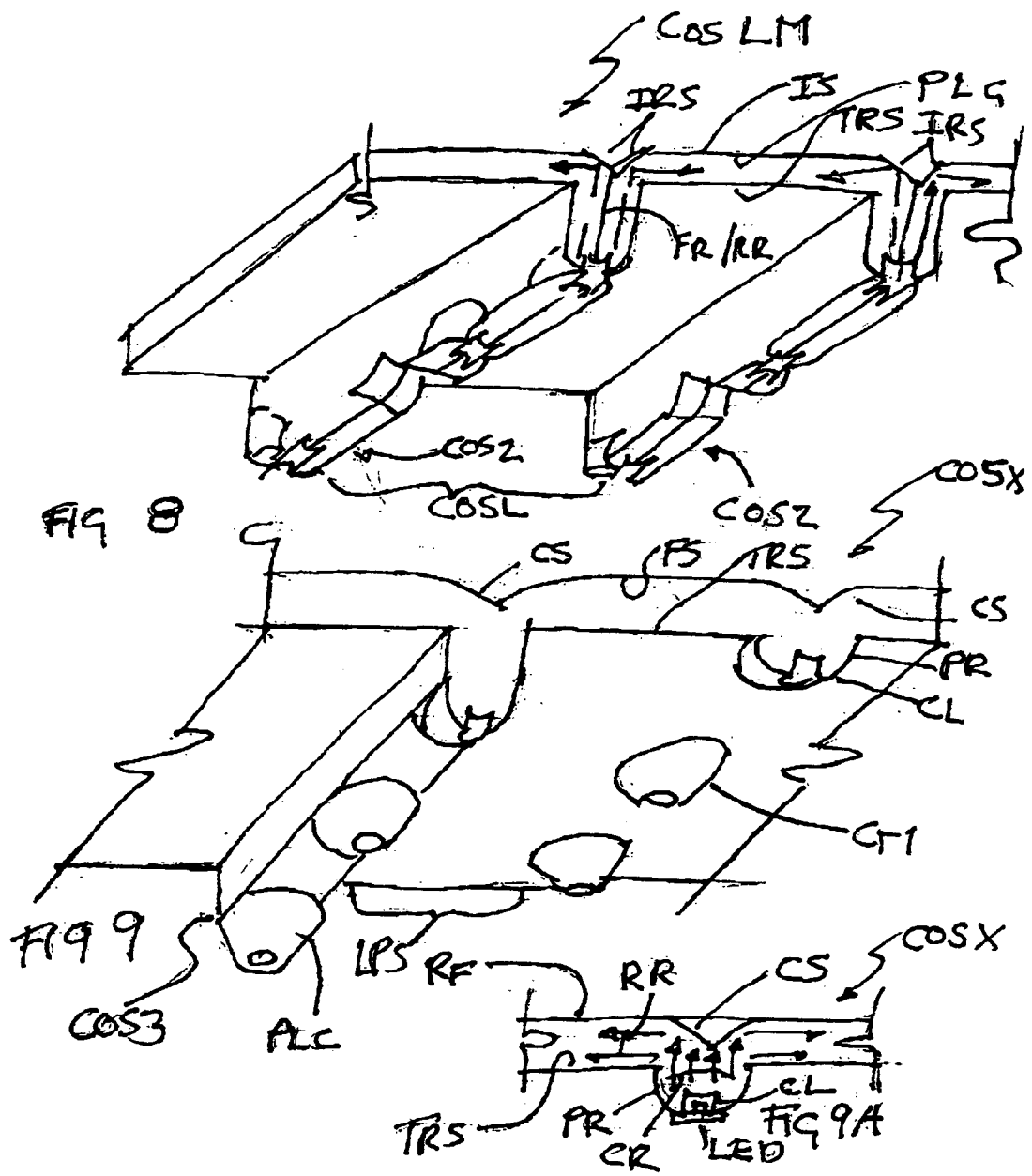

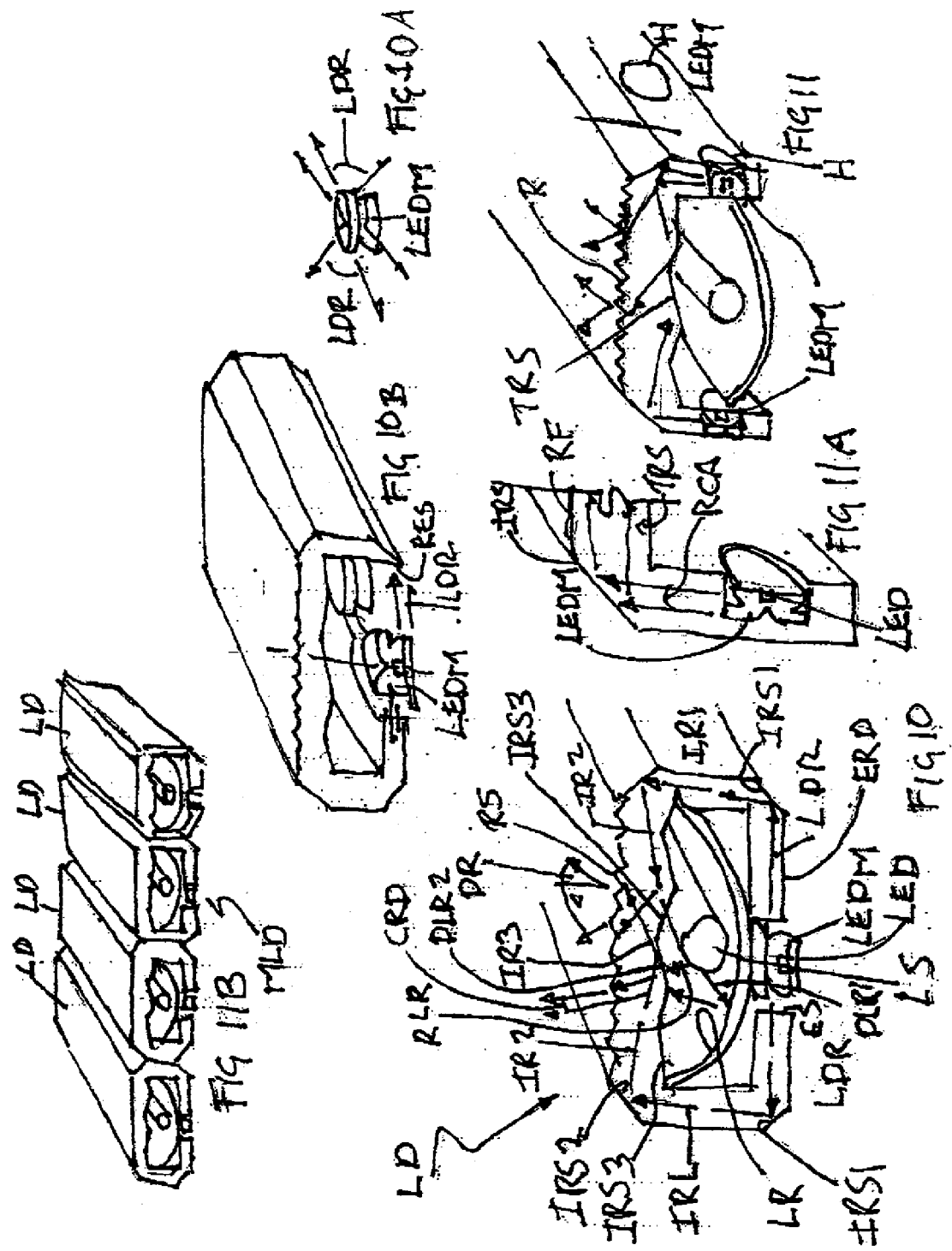

ILLUMINATING DEVICES INCLUDING UNIFORM LIGHT DISTRIBUTION, MULTIPLE LIGHT SOURCES, AND MULTIPLE TYPES OF LIGHT SOURCES

REFERENCE TO RELATED APPLICATIONS

The present application is based on and claims the priority of provisional application Ser. No. 60/664,412 filed Mar. 23, 2005. The substance of that application is hereby incorporated herein by reference.

FIELD OF INVENTION

The present invention relates generally to the lighting field, and, more particularly to unitary illuminating devices.

SUMMARY OF INVENTION

The present invention provides an optical device wherein all optical elements are arranged in a unified body (hereinafter referred to as "unitary device") that provides a predetermined pattern of illumination from multiple quasi-point sources, such as LEDs.

The present invention also provides unitary illuminating devices that can mix color from various light sources into predetermined and or homogenized color patterns. This invention provides for the mixing of the light from various types of quasi point sources such as LEDs, halogen, and or HID into predetermined and or homogenized light patterns. It also mixes the light from quasi point sources such as LEDs, halogen, and or HID, and linear sources such as fluorescent (and compact fluorescent) and cold cathode.

The present invention also is for unitary optical devices that can be configured in multiple assemblies as per the illumination requirement, and also is one that can be mass produced in extruded or injection molded process. It provides for unitary optical devices that can be configured in multiple assemblies as per the illumination requirement, and also a "window" (containing its own light source) from another source to pass through.

BRIEF DESCRIPTION OF THE DRAWINGS

These and other objects, features and advantages will be apparent from the following detailed description of preferred embodiments taken in conjunction with the accompanying drawings in which:

FIG. 1 is an isometric view
FIG. 1A is a sectional view of FIG. 1.
FIG. 1B is a sectional view of two COS units.
FIG. 1C is a view showing two COS units inverted.
FIG. 1D is a partial section view taken along AX of FIG. 1C.
FIG. 2 is an isometric view of a composite light guide similar to that shown in FIG. 1.
FIG. 2A is a sectional view of COS of FIG. 2.
FIG. 3 is a partially cutaway view of a construction of a multiple composite light guide as shown in FIG. 1.
FIG. 4 is a partially cutaway view of a multiple cutaway light guide as shown in FIG. 3.
FIG. 5 is a cross sectional view of FIG. 4.
FIG. 8 is an isometric and sectional view of a device similar to that shown in FIG. 7.
FIG. 9 is a view showing an alternative construction to that shown in FIG. 8.
FIG. 9A is a partial sectional view of FIG. 9.
FIG. 10 is a view of a device using two types of light sources.
FIG. 10B is an isometric view of a device similar to that shown in FIG. 10.
FIG. 11 is an isometric view of a device similar to that shown in FIG. 10.
FIG. 11A is an isometric view showing a detail of FIG. 11.
FIG. 11B is an isometric diagram of a row of illumination modules.
FIG. 12 is a cross sectional view of a hollow light guide.

DETAILED DESCRIPTION OF PREFERRED EMBODIMENTS

FIG. 1 is a three dimensional view of a section of a substantially planar composite light guide COS (composed of a clear transparent material such as acrylic, or polycarbonate plastic, or glass) having the following optical elements molded or machined into the edges of the guides, TLG, and or adjacent surfaces. A conical depression PR, the face PES of which can be parabolic, ellipsoidal or flat in section and is rotated at least partially about the cone axis AX which is also the light axis of a quasi point source QP such as an LED which is located substantially at the focal point of the conical faces. Also formed about AX is a hollow having the following surfaces RCSA, which is spherical or aspherical in section and rotated around AX and surface ES which is flat, domed, or conical in section, the center of with lies on AX.

Light radiating from QP as rays RL enters rotated face RCSA and is collected and projected by the spherical or aspherical surface of RCSA as radial rays FR outwardly and through COS. Also, RL passes through surface ES, and is internally reflected by PES in a radial direction as rays RR, substantially parallel to rays FR.

FIG. 1A is a section view of FIG. 1 illustrating the function of COS in FIG. 1.

FIG. 1B is a section view of two COS units COS1 and COS2 butted together having surfaces PES, ES, and RCSA, aligned, each forming a 360° rotation about AX. LED/QP lies on the shared axis AX of COS1 and COS2. The combined COS1 and COS2 capture substantially the entire radiant flux of QP/LED.

FIG. 1C illustrates two COS units COSL and COSU inverted to form a mirror image to COSL. Both COSU and COSL have substantially the same function. Line HL indicates the plane at which COSL and COSU are joined.

FIG. 1D is a partial sectional view taken at AX of FIG. 1C, illustrating that both the function of COSL and COSU have a similar function to that of COS FIG. 1 and the combined COSL and COSU capture and utilize substantially the entire radiant flux of QP/LED, which is facing inward toward combined COSL and COSU.

Figure 1E:
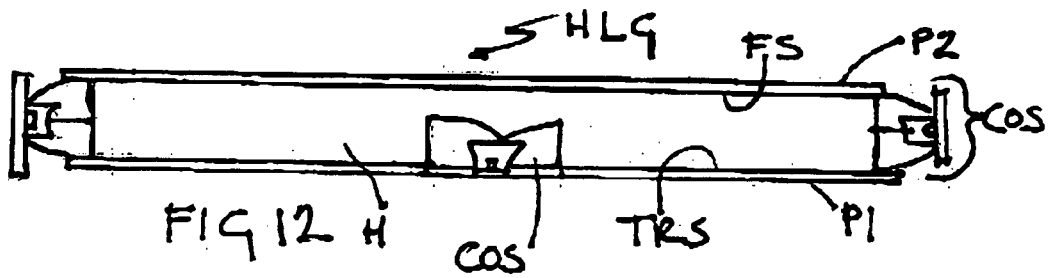
FIG. 1E is a partial sectional view of FIG. 1C similar to that of FIG. 1D.

FIG. 1E is a partial sectional view of FIG. 1C similar to that of FIG. 1D, differing in that COSL and COSU are fused into a single unit, not divided along plane HL.

Figure 1F:
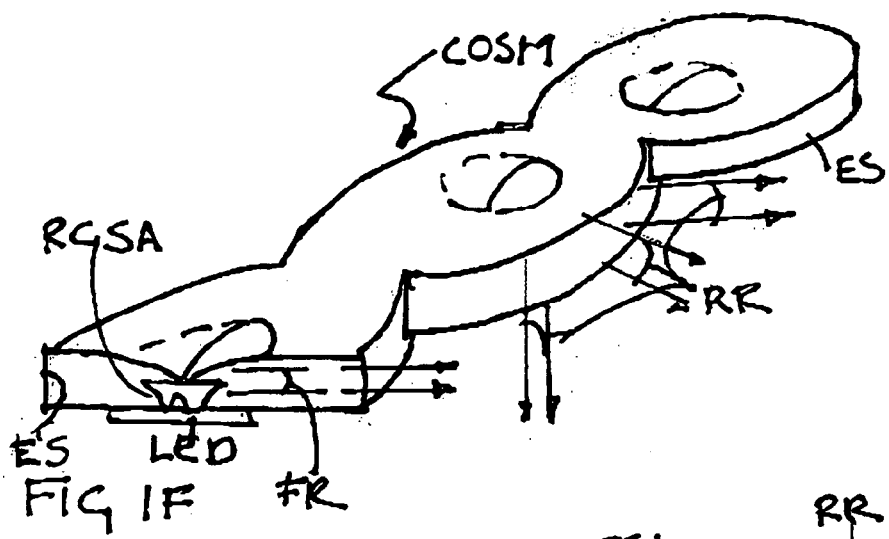
FIG. 1F is an isometric and sectional view of a light projecting element.
Figure 6:
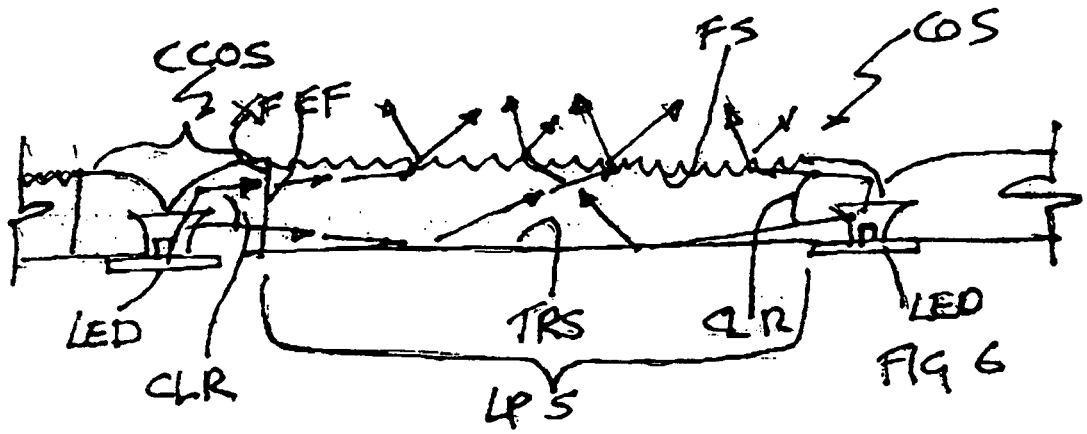
FIG. 6 is a cutaway partial view of a device similar to that shown in FIG. 3.

FIG. 1F is a three dimensional and cross-sectional diagram of a light projecting element COSM that is similar in section to that of CCOS in FIG. 6 with the addition of curved exit face ES (which addition, although in FIG. 1F is shown substantially circular and concentric to RCSA, can be elliptical or aspherical as well.)

Figure 1G:
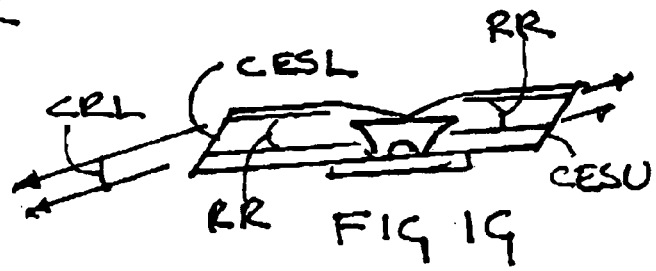
FIG. 1G is a cross sectional view of FIG. 1F.

FIG. 1G is a cross-sectional diagram of FIG. 1F and CCOS of FIG. 16 illustrating that ES of FIG. 1F can be canted as exit faces CESL and CESU causing radially collimated rays CESL to exit as canted radial beams CRL and CRU respectively.

Figure 1H:
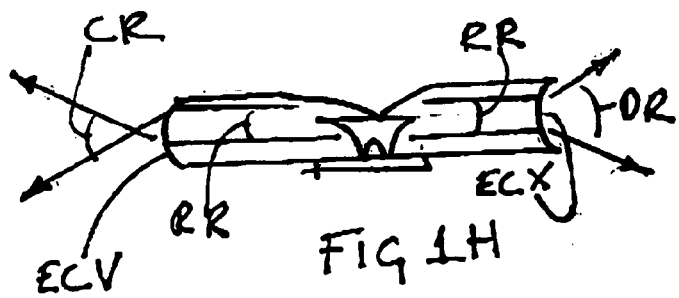
FIG. 1H is a cross sectional view of FIG. 1F

FIG. 1H is a cross-sectional diagram of FIG. 1F and CCOS of FIG. 6 illustrating that ES of FIG. 1F and CCOS of FIG. 6 illustrating that ES of FIG. 1F can be concave ECV or convex ECX, causing RR to converge (in section) as rays CR or diverge in section DR respectively.

FIG. 2 is a three dimensional diagram of a composite light guide similar to that shown in FIG. 1, with the addition of internally reflective surfaces PS. The function of surfaces PS are further explained in FIG. 2A. PS can be flat or curved; if curved, a circular parabola PE or ellipse PEE shape contoured parallel to HL can be formed. PS may be contoured in a compound curve, being a section of a sphere, parabola, or ellipse.

FIG. 2A is a sectional view of COS of FIG. 2 at a plane substantially parallel to HL of FIG. 1C through RCSA, looking towards PES, a portion of the rays RL that are radially collimated by surface RCSA and PES as rays RF and RR respectively are internally reflected by PES as rays FRR and RRR respectively. Further, ellipse PEE reflects rays RR and FR as rays FRE towards and through focal point FP. Internally reflecting optical elements in FIGS. 1 through 2A, including PES and PS, could be replaced by reflectors of similar shape molded into the clear transparent material in substantially similar positions.

FIG. 3 is a partially cutaway view of a construction of a multiple composite light guide as illustrated in FIG. 1, illustrating how light from lines of quasi-point sources LED and LED2 are projected through COS, reflected by surfaces TRS though refracting surface FS. The surface quality of TRS can be polished to reflect by internal reflecting and or can be diffused and deposited with a reflective surface. The surface quality of FS can be at least partially diffused and or be partially prismatic, having a pattern of prismatic grooves, pyramids, negative or positive pillow lenses or other prismatic shapes. A reflective surface ER can be integrated into edge surface of COS.

FIG. 4 is a partially cutaway view of a construction of multiple cutaway light guide as illustrated in FIG. 3, differing in that alternate rows of LEDs have been substituted by linear light sources LS1, LS2, and LS3. Each linear light source is surrounded by a linear collection system LCS having substantially the same sectional design and function as the radial collection system described in FIG. 1. As described in FIG. 1, the mixing and distribution of light between LS and LED is similar to that described between the rows of LEDs.

FIG. 5 is a cross-sectional view of FIG. 4 with the addition of linear reflector PRS which gathers light DLL that is directly emanating from LS, and reflects it through both surfaces of COS as rays LRR that mix with rays LER from LED.

Figure 7:
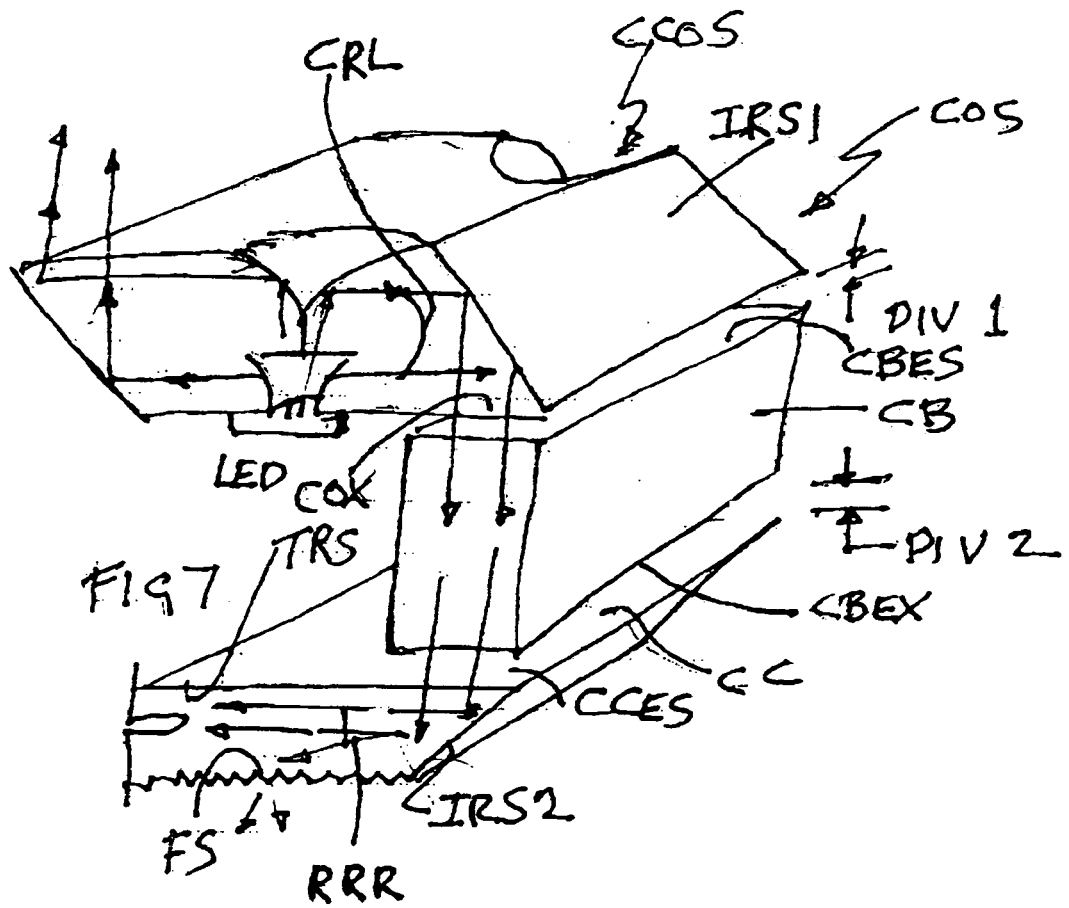
FIG. 7 is an isometric view of a device have three primary components.

FIG. 6 is a cutaway partial view of a composite illuminating device similar to that illustrated in FIG. 3 with the addition of a detailed example of how collected light CRL from the quasi point source LED (or the collimated light from a linear light source LS of FIG. 4) is refracted by FS (away from the device) whether FS receives rays CRL directly or as rays reflected by TRS. Also optical guide COS is shown to be constructed in two alternate ways. On the left side of FIG. 6 the light collection portion of COS, CCOS is abutting the light projecting LPS, which has an entry face allowing rays CRL to enter into LPPS that have exited face XF of CCOS FIG. 7 is a three dimensional diagram of an illuminating device having three primary components CCOS, CB, and CC. CCDS collects rays CRL which are reflected by surface IRS, through exit face COX of CCOS, into and through CB by entering entry face CBES and out exit face CEBX; and further entering CC through entry face CC5, further being reflected by IRS2 into and through CC as rays RRR. Rays RRR are caused to exit from CC through the interrelationship of TRS and FS as explained in FIG. 6. The device illustrated in FIG. 7 can be constructed of components CCS and CB only when CB is comprised of surface FS and TR5 and emits light as described in FIG. 6. Although components CCOS, CB HHH CC are shown (for graphic purposes) having divisions DIV 1 and DIV 2 that can be abutted or can be molded as a unified element, eliminating COX, CBES, CBEX, and CCES.

FIG. 8 is a three dimensional and sectional view of an illuminating device COSLM similar in function to the illuminating device described in FIG. 7, comprised of CO5 the function of which is described in FIGS. 1C, 1D, 1E, 2, and 2A. COSLM is a duplicate multiple of COSL.

Rays FR/RR (as described in FIG. 1D) are reflected by surfaces IRS into substantially planar light guide PLG. PLG is comprised of surfaces TRS and FS, the function of which is described in FIG. 6.

FIG. 9 illustrates an alternative construction of an illuminating device to the illuminating device illustrated in FIG. 8, differing in that the light collection components CM (a combined parabolic or ellipsoidal, internally reflecting segment PR and a spherical or aspherical segment) CL and CS an internally reflecting cone replaces the optical surfaces described in FIGS. 1 through 2A.

FIG. 9A is a partial cross-sectional view of FIG. 9 illustrating the function of COSX. Light rays emanating from LED are collected by internally reflecting surface PR and lens surface CL as rays CR which are internally reflected by conical surface CS in a radial pattern through and away from COSX by TRS and RF.

FIG. 10 illustrates an illuminating device LD that emits and mixes light simultaneously from two types of light sources. The first light source LS is linear, such as fluorescent or neon. The second type of light source is a quasi point light source LED, such as an LED, HID, or filament source. Both LS and LED have an optical component(s) to control and direct light from the light source outwardly. In the case of LS the optical component, illustrated as LR, it is a linear reflector. In the case of LED, the optical component is a radially collimating device LED as described in my U.S. Pat. No. 5,897,201. This is further illustrated in FIG. 10A showing rays LDR projected radially from LEDM. Both the light from LS and LED leave LD from the same surface RS. This is accomplished as follows: Direct rays DRL1 emanating from LS are reflected by LR as rays RLR through surfaced IRS3 and out through RS as CRD. Rays LDR emanating from LEDM enter face E5 and are internally reflected by surface IRSI, which are further internally reflected by surface IRS2 as ray IR2, which; are further internally reflected by face IRS3 as rays IR3 through RS as ray DE.

FIG. 10B is a three dimensional illustration of an illuminating device similar to the illumination device of FIG. 10 showing an entry surface RES which is not immediately surrounding LEDM as the entry face ES in FIG. 10.

FIG. 11 is a three dimensional illustration of an illuminating device similar to the illumination device illustrated in FIG. 10 differing in that LEDM modules are inserted in holes H located in the lens L of the device.

FIG. 11A is a three dimensional detail of FIG. 11 illustrating a section of radially collimated rays RCA projected by LEDM onto reflecting surfaces IRS, IRS redirecting RCA onto surfaces TRS and RF.

FIG. 11B is a three dimensional diagram of a row of LD illumination modules MLD.

FIG. 12 is a cross-sectional diagram of a hollow light guide HLG comprised of substantially parallel panels P1 and P2, P1 having surface FS that provides primarily a reflective function, and P2 having surface FS that provides primarily a refractive function. A linear light projecting element CCOS, similar to that of CCOS in FIG. 6 and a linear light projecting element COS2 in FIG. 1 and FIG. 2A.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. An optical device for collecting and distributing light from a quasi point light source comprising:
   a) a planar light guide along at least one edge of said planar light guide where at least one optical axis is disposed perpendicular to said light guide;
   b) a hollow space formed in the edge of said light guide having a rotated convex surface about said optical axis, said hollow space having an opening on one face of said light guide, partially surrounding said optical axis and a closed surface also partially surrounding said optical axis, the dosed surface having a greater diameter than the opening; and
   c) a quasi point light source having an optical axis coincident to said optical axis and disposed at said opening at the face of said light guide, said quasi point light source being disposed so that a portion of light emanating from said light source is collected and projected into said light guide by said rotated convex surface, and a portion of said light passing through said dosed surface of said hollow space.

2. An optical device as in claim 1 wherein the closed side of said hollow space is flat.

3. An optical device as in claim 1 wherein the closed side of said hollow space is a convex light collecting surface.

4. An optical device as in claim 1 wherein a depression is formed as a rotated surface within the surface of said light guide about said optical axis disposed so as to reflect redirect light passing through said closed surface into said light guide.

5. An optical device as in claim 4 wherein the section of said rotated surface is flat.

6. An optical device as in claim 4 wherein the section of the rotated surface is convex in relationship to the inside of the light guide.

7. An optical device as in claim 1 wherein said planar light guide is in the form of at least one side of at least two adjacent walls of at least a portion of a rectangular tube with at least a portion of the light passing through from one side of said light guide is internally reflected into another side of said light guide.

8. An optical device as in claim 1 wherein at least one surface of said light guide has a prismatic surface refracting at least a portion of the light passing between the faces of said light guide out of the face of said light guide.

9. An optical device as in claim 1 wherein an optical surface formed within the edge of the said light guide is disposed so as to at least partially surround said combined surfaces of said hollow area so as to redirect at least a portion of the light projected by said rotated convex surface through said light guide.

10. An optical device as in claim 1 wherein at least two said light guides are butted together, said optical axis of one light guide being coincident with the optical axis of the other light guide, said rotated surfaces forming a continuous surface about said optical axis(s).

* * * * *